Sept. 12, 1933.   D. H. ANDERSON   1,926,133
POULTRY NEST
Filed Feb. 25, 1929
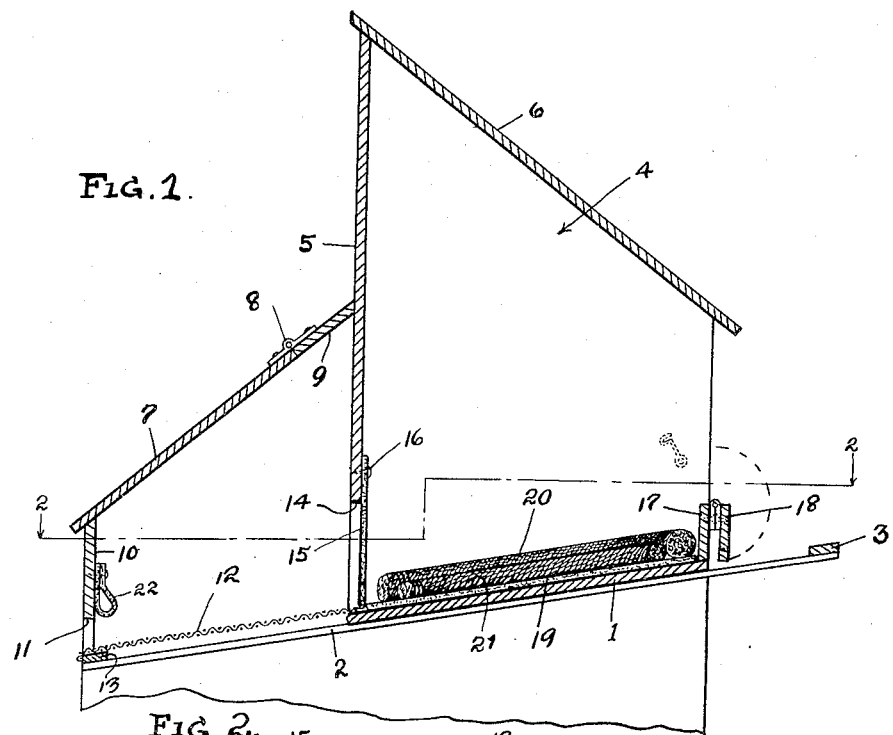
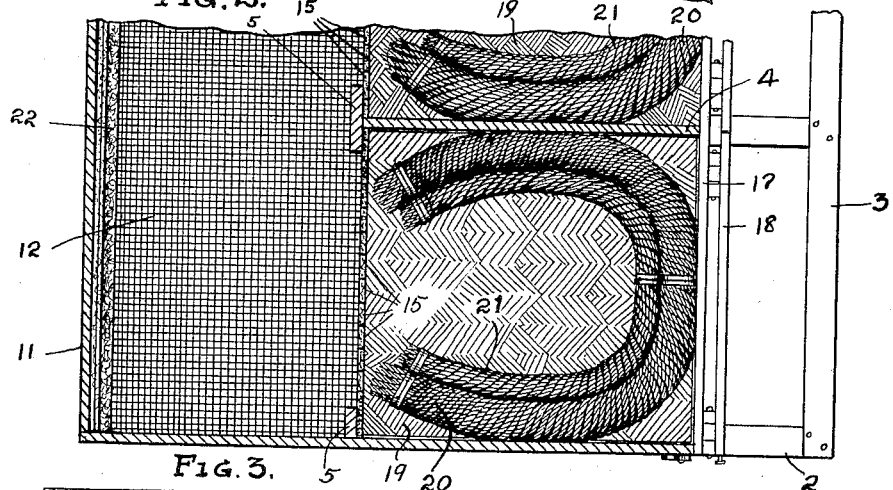
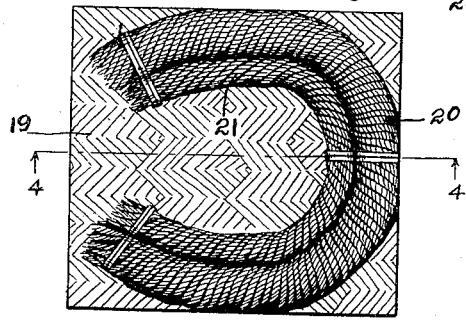
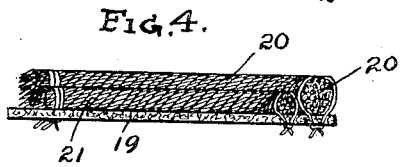
INVENTOR.
DAVID H. ANDERSON
BY *Miller Boykin & Fried*
ATTORNEYS.

Patented Sept. 12, 1933

1,926,133

UNITED STATES PATENT OFFICE 1,926,133

POULTRY NEST

David H. Anderson, Petaluma, Calif.

Application February 25, 1929. Serial No. 342,384

5 Claims. (Cl. 119—48)

This invention relates to poultry nests as used in the commercial production of eggs in the poultry business, and has for its objects improvements in such nests whereby sanitation will be promoted, the eggs will be maintained in a cleaner condition than formerly possible, the eggs will be removed from under the hens almost as quickly as laid so that no eggs will accumulate in the nests to be soiled by other hens, or attract brooding hens.

In the drawing accompanying this application Fig. 1 is a vertical sectional view taken through my improved nest.

Fig. 2 is a plan view of Fig. 1 taken along the line 2—2 thereof.

Fig. 3 is a top plan view of the nest pad.

Fig. 4 is a sectional view of the nest pad of Fig. 3 taken along the line 4—4 thereof.

Briefly described my improved nest comprises a series of nest stalls arranged in the well-known manner, but the floor of the nest is slanted at an angle so that the egg will roll from beneath the hen in a backward direction into a second compartment wherefrom they may be gathered from time to time. The second compartment has a flooring of grille work or wire screen so that any dirt will fall through, and the partition between the egg-receiving compartment and the nest proper is provided with curtains of flexible material to permit passage of the egg in rolling from the nest, while closing off the eggs from sight of the hen.

Since it is manifest the eggs could not roll out of a nest filled with loose material such as straw or the like, a feature of my nest comprises a special nest pad which will promote the rolling of the egg and likewise attract the hen to sitting therein, for it is found that a great deal depends on the condition of the nest pad as to whether a hen will or will not lay an egg in the compartment.

Other features of the invention will appear in the following description and the drawing.

It is of course understood that any number of compartments may be provided in nests of the character mentioned, hence the drawing will show but one compartment as it will illustrate all the features involved in the invention.

In Fig. 1 the nest has a base board 1 supported on suitable cross pieces 2 projecting forwardly with a perch at 3 and carrying spaced partitions 4 separating the nest into a plurality of compartments as indicated in Fig. 2. A vertical board 5 forms the back of the compartments while a forwardly and downwardly slanted roof 6 closes the top of the compartments or laying stalls as they may be termed.

At the rear of the laying stalls thus formed is a long compartment extending the length of the nest structure and closed by a downwardly slanted lid 7 hinged at 8 to a fixed roof portion 9, and which downwardly slanted roof portion 7 rests on a horizontal rear frame member 10 spaced as at 11 about three-quarters of an inch above the floor of the rearward compartment. This floor of the rearward compartment is indicated at 12 and preferably consists of a sheet of coarse wire screen, though it may be a series of grille-like bars if desired. The perforated or screen floor 12 extends from the solid floor board 1 to a rearward supporting strip 13 as indicated.

Vertical partition board 5 is cut away in each nest stall to the point 14 high enough to permit eggs laid in the stall to roll through into the egg gathering compartment, while closing this cut out portion is a plurality of hanging strips of felt or other flexible material 15 secured to the upper portion of the partition 5 as at 16. The strips of material preferably touch one another so as to close a view of the gathering compartment from the nest stall, and the material is flexible enough so that the eggs will roll through them by gravity, the floor being slanted sufficiently for this purpose as indicated.

In front of the stalls is a low strip or protective edge 17, to which is hinged a further strip 18 which may be folded upwardly as indicated by the dotted line, or hooked in closed position to prevent the hen from gaining access to the nest except at such times as is desirable.

Within each stall is a nest pad indicated at 19, and as already suggested, much depends on the nature of this pad in order to make the nest a success, for I have found that some materials which would seem to be suitable, such for instance as paper matting, are objectionable to the hens, and after having experimented with quite a number of different materials I have discovered that the rough carpet material known as cocoanut fiber matting fills every requirement and attracts the hens to the stall to lay. This matting is about a quarter of an inch in thickness and may be used in little squares simply dropped into place and held from sliding rearward by the inwardly projecting portions of partition 5 forming the termination of the openings 14.

Since a perfectly flat pad is lacking somewhat in the requirements of a nest to attract a hen to lay, and since it is impracticable to have loose material in the nest which would interfere with the freedom of rolling of the eggs, I have found that the nest quality of the pad may be considerably improved by sewing or otherwise attaching thereto one or more horseshoe-shaped lengths of ordinary rope as indicated in the figures. Preferably two sizes of the rope are used, one outer piece 20 of relatively large rope and an inner horseshoe-shaped length 21 lying adjacent the larger piece so as to form a graduated nest-like pad freely open at the rearward end without obstruction so that the eggs can roll out through the hanging strips of flexible material 15.

Such pads are easily picked out and cleaned or aired as may be required, and while I show the pad as resting on a solid lower board 1, it is manifest that the screen material 12 of the egg-gathering compartment could extend over the entire bottom of the nest if desired, as the pad would effectually close off any draught. However, the solid board construction as shown at 1 is satisfactory for the egg-laying compartment.

The decided pitch to the roof sections 6 and 7 is for the purpose of preventing the hens from roosting on the top of the nests as they otherwise would be likely to do.

In operation the hens upon laying the eggs usually move around a bit and almost any movement will liberate the egg to roll from beneath the hen by gravity backward into the egg gathering compartment, and upon the hen's finding there is no egg beneath her she does not stay an unnecessary length of time in the nest but gets out so that it is ready to receive another hen. During the laying process the eggs may be freely gathered by lifting the lid 7 and removing them from the screen 12 without in any way disturbing the setting hen.

The space 11 provides for sweeping out any dirt which may accumulate on the screen 12, though the relatively coarse openings in the screen provide for passage of most of the dirt through the same, as well as tending to loosen and remove any adhering dirt from the eggs while same are rolling.

While the eggs do not roll fast enough to meet with a dangerous shock against the guard rail 10, nevertheless I may provide the rail with a soft cloth or felt bumper strip as indicated at 22.

Having thus described my improved poultry nest it will be seen to effect the various objects of the invention, and any modifications of the same which may fall within the spirit of the invention are intended to be covered in the appended claims.

I claim:

1. In a poultry nest, a relatively flat pad of pliable material provided with a flexible ridge on its upper surface of horseshoe-like form open at the ends of the horseshoe sufficient for an egg to pass through, said ridge being formed with a rounded upper edge and means supporting said pad in a tilted position in a manner whereby an egg within the horseshoe-like form will roll out between the ends of said form.

2. In a poultry nest, a relatively flat imperforate pad provided with a flexible ridge on its upper surface of horseshoe-like form open at the ends of the horseshoe sufficient for an egg to pass through, said ridge being formed of rope and means supporting said pad in a tilted position in a manner whereby an egg within the horseshoe-like form will roll out between the ends of said form.

3. In a poultry nest, a relatively flat pad provided with a flexible ridge on its upper surface of horseshoe-like form open at the ends of the horseshoe sufficient for an egg to pass through, said ridge being formed of two rows of rope defining the inner and outer sides of the horseshoe-like form respectively, the rope defining the inner side of the form being of smaller diameter than the rope defining the outer side thereof.

4. In a poultry nest comprising a stall with a flat floor, a relatively flat pad covering said floor and provided with a flexible ridge on its upper surface, the pad and flexible ridge being removable as a unit from said floor and stall, said ridge being of horseshoe-like form with a rounded upper surface and open at the ends of the horseshoe sufficient to pass an egg and means supporting said pad in a tilted position in a manner whereby an egg within the horseshoe-like form will roll out between the ends of said form.

5. In a poultry nest, a relatively flat pad provided with a flexible ridge on its upper surface of horseshoe-like form open at the ends of the horseshoe sufficient for an egg to roll through, means supporting said pad in a tilted position in a manner whereby an egg within the horseshoe-like form will roll out between the open ends of said horseshoe-like form, and said ridge being formed with a rounded upper edge.

DAVID H. ANDERSON.